United States Patent [19]
Shelton

[11] Patent Number: 6,141,898
[45] Date of Patent: Nov. 7, 2000

[54] FISHING ROD CONTROLLER

[76] Inventor: Billy R. Shelton, 5279 Salisbury Dr., Newark, Calif. 94560

[21] Appl. No.: 09/399,912

[22] Filed: Sep. 21, 1999

Related U.S. Application Data

[63] Continuation-in-part of application No. 08/789,762, Sep. 21, 1999, Pat. No. 5,953,846.
[60] Provisional application No. 60/011,245, Feb. 6, 1996.

[51] Int. Cl.[7] .................................................. A01K 97/00
[52] U.S. Cl. ............................ 43/21.2; 224/200; 224/922
[58] Field of Search ....................... 43/21.2, 25; 224/200, 224/185, 922, 251, 222; 248/514, 538; 211/70.8

[56] References Cited

U.S. PATENT DOCUMENTS

| | | |
|---|---|---|
| 1,583,181 | 5/1926 | Rubio . |
| 2,271,136 | 1/1942 | Geiger . |
| 2,969,899 | 1/1961 | Brooks . |
| 4,828,152 | 5/1989 | Pepping .................................. 224/200 |
| 5,738,256 | 4/1998 | Goff ........................................ 224/185 |
| 5,855,086 | 1/1999 | Pandeles ................................. 43/21.2 |
| 5,956,883 | 9/1999 | Krouth ..................................... 43/21.2 |
| 5,988,466 | 11/1999 | Brown . |

*Primary Examiner*—Jack W Lavinder
*Attorney, Agent, or Firm*—Carol D. Titus; James J. Leary

[57] ABSTRACT

A fishing rod controlling device has four general sections: a leg pad, a curve section, a rod holder, and a belt. The fishing rod controller may be constructed by post-forming a section of plastic pipe. In the section of the controller that forms the leg pad, the pipe is split and spread apart far enough to allow the user's leg to rest within the curve. Above the leg pad and just below the curve, is a belt attachment. The controller is slit on both sides so belting material may be run through the slits. The belt is fit around the user's waist. Above the belt, the rod controller curves outward (away from the body of the user). The uppermost section of the rod controller is the rod holder. This section is a hollow cylindrical section of the pipe which is left unaltered in the basic version of the rod controller. It is within the cavity in the rod holder section that the rod is placed. A second embodiment of the rod controller has an adjustable attachment mechanism which attaches the rod holder section and the leg engagement section. The attachment also allows the user to exchange the rod holder for other types of holder sections. Alternate embodiments of the rod controller have extensions which allow the rod controller to be used for specialized rods and reels as well as being a support base for other devices such as rifles, guns, video cameras, photographic equipment, binoculars, spotting scopes, surveying equipment.

21 Claims, 14 Drawing Sheets

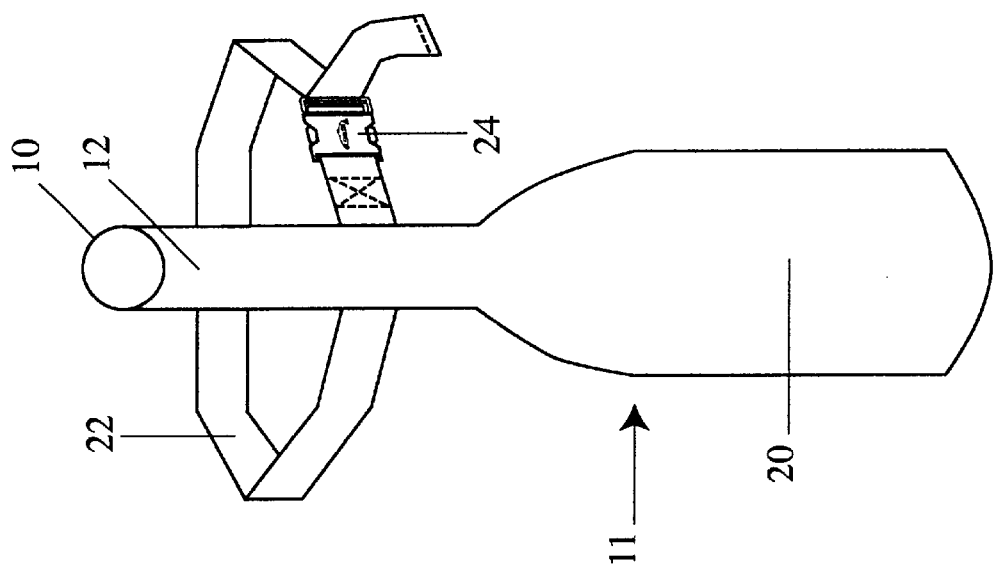
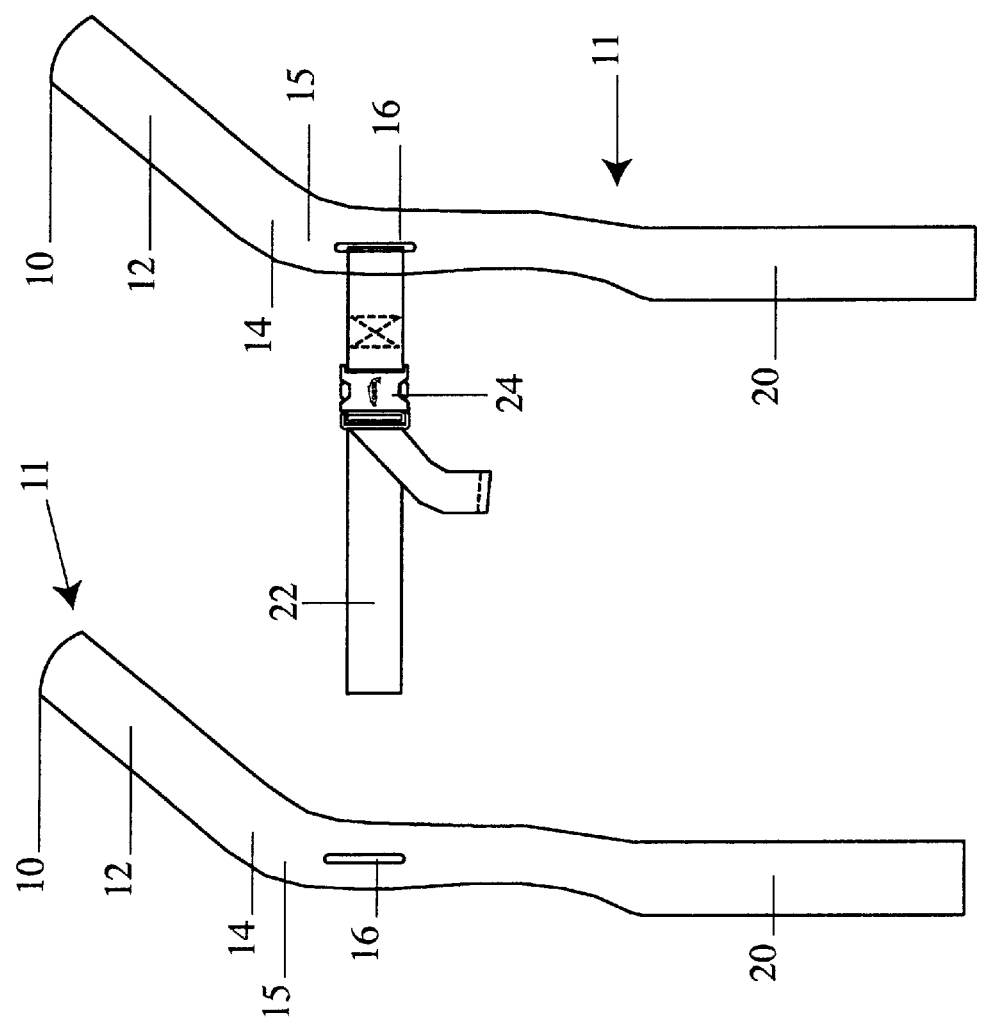

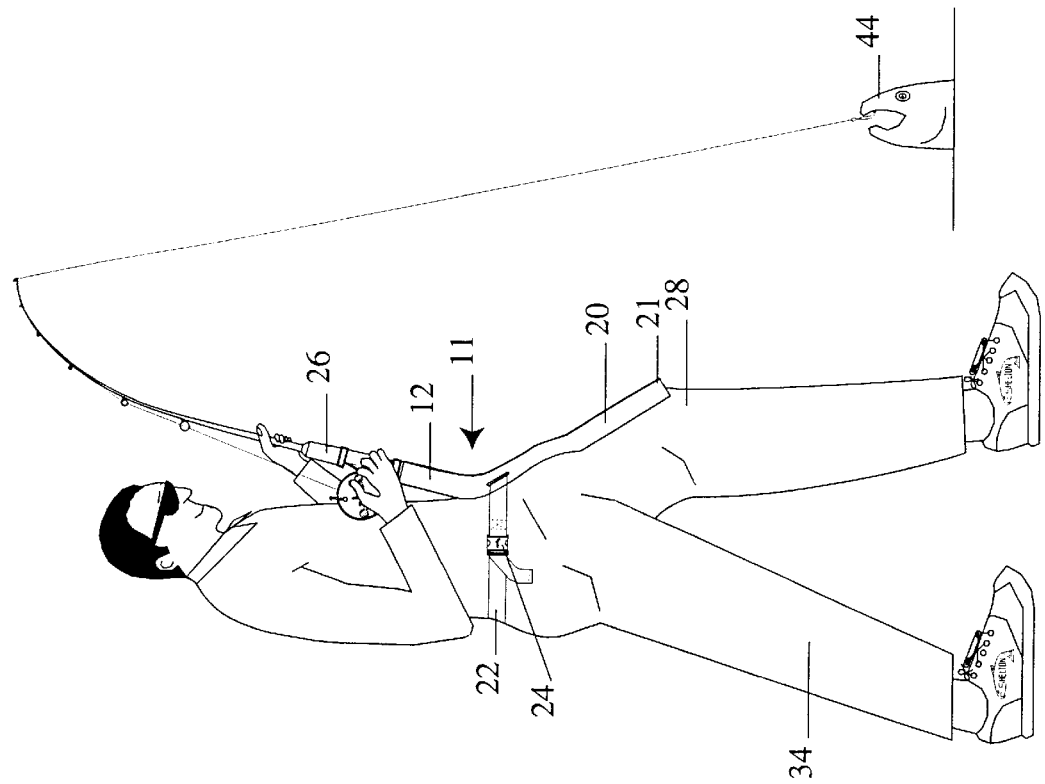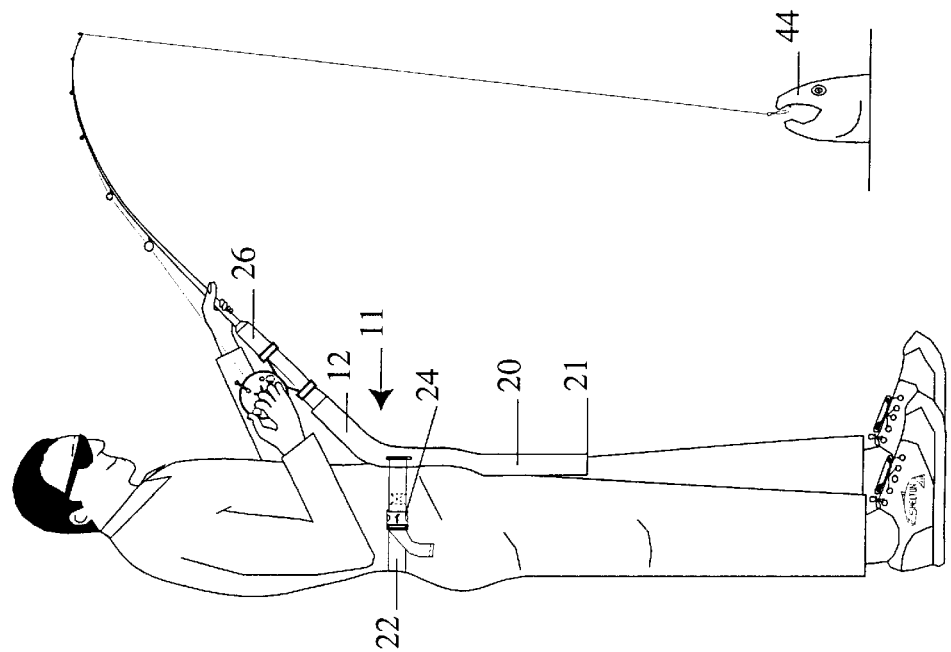
FIG 3B
FIG 3A

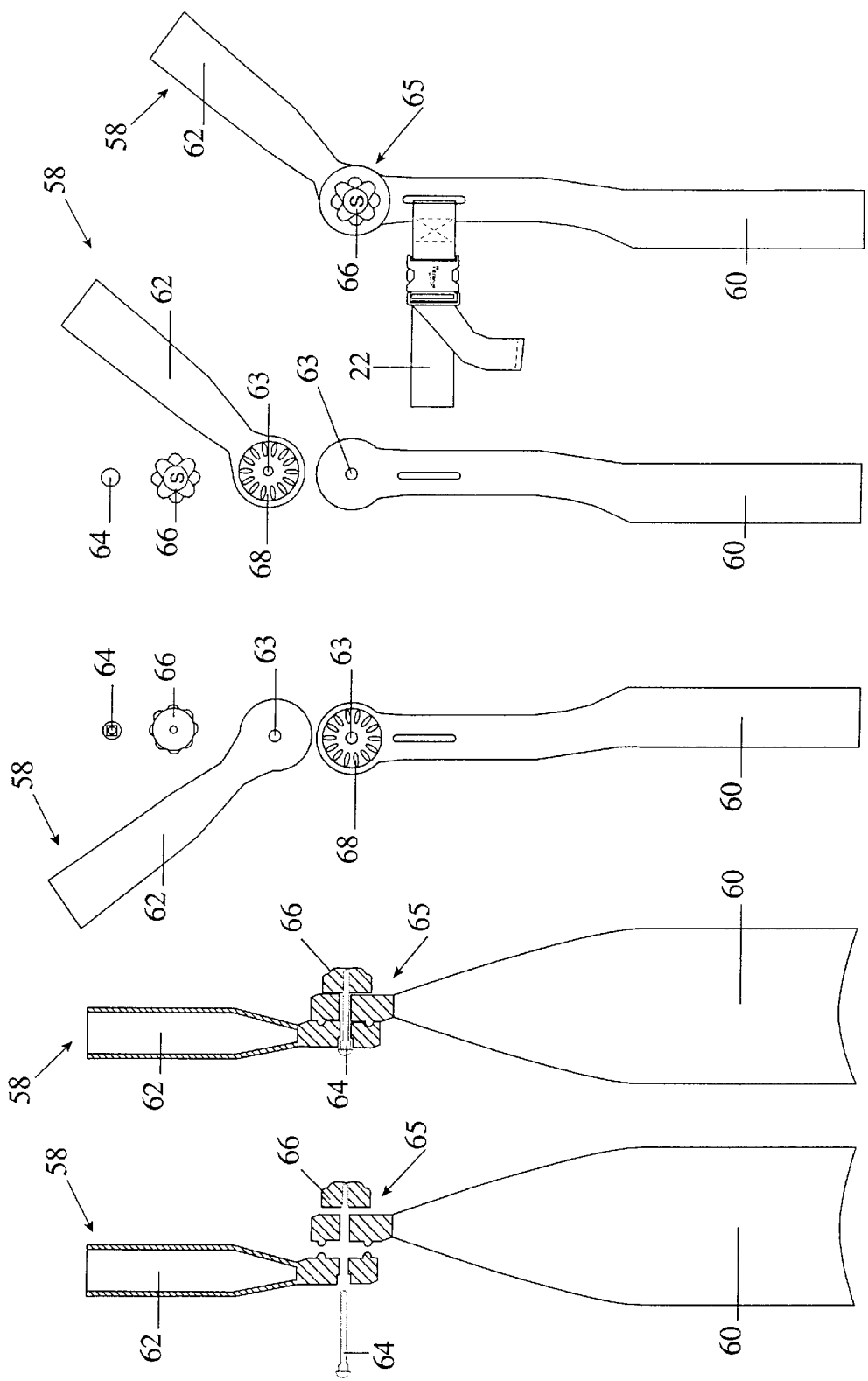

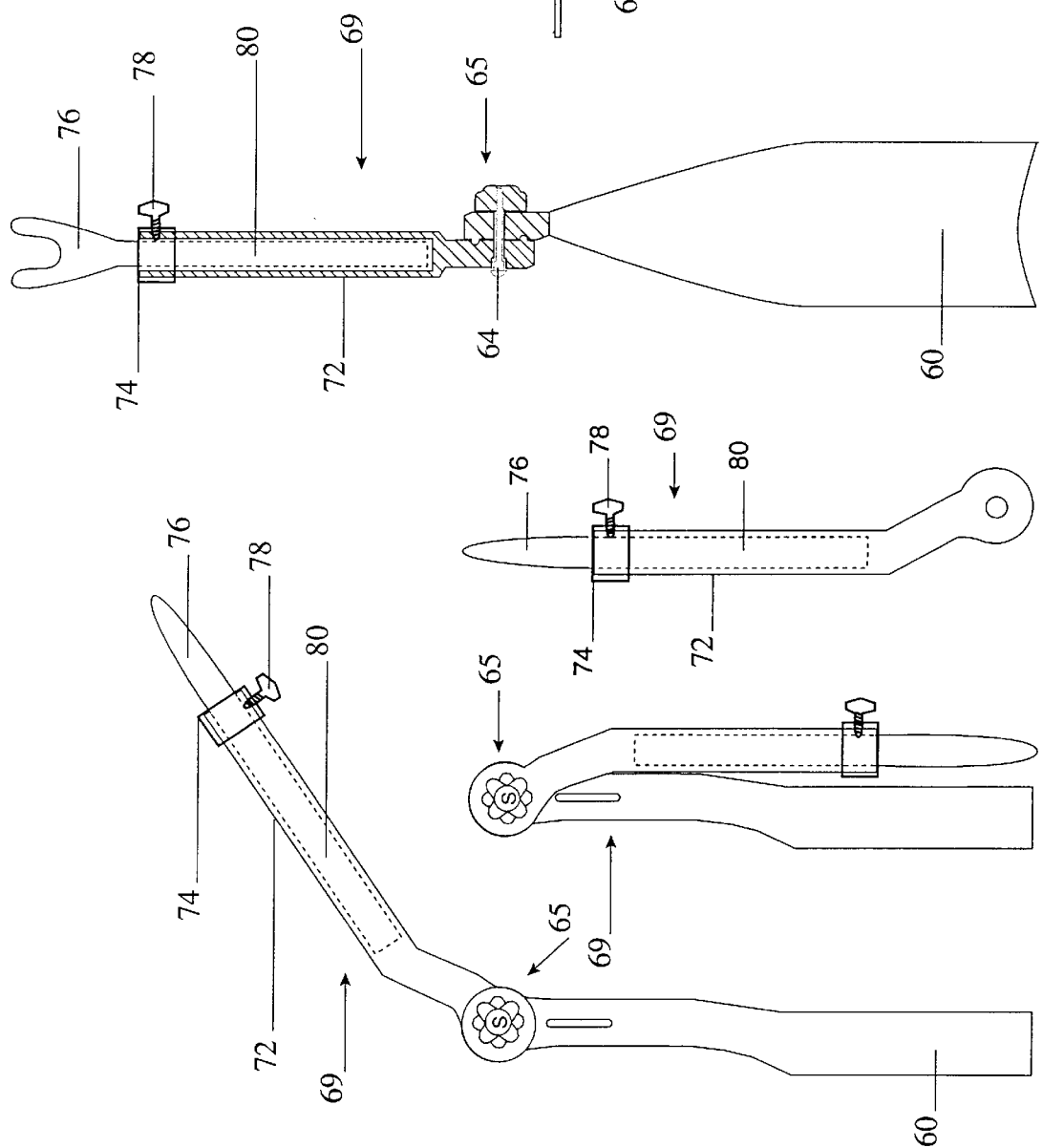

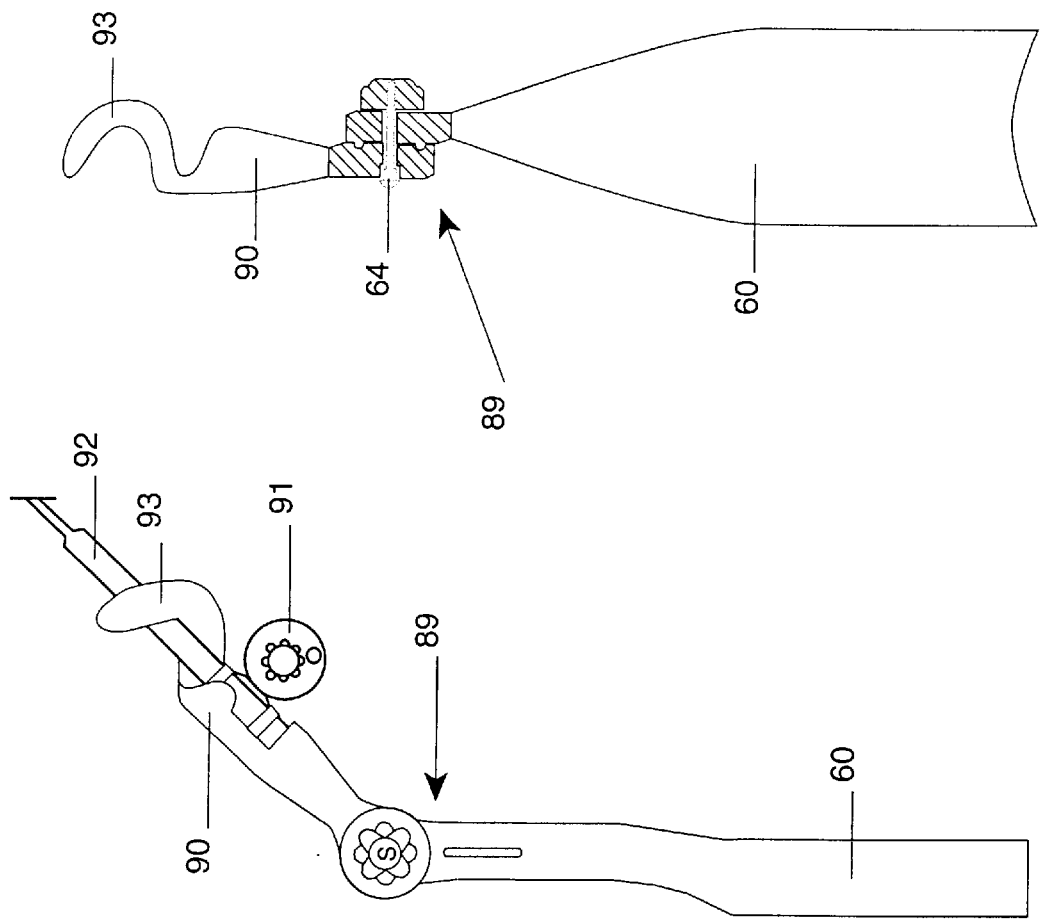

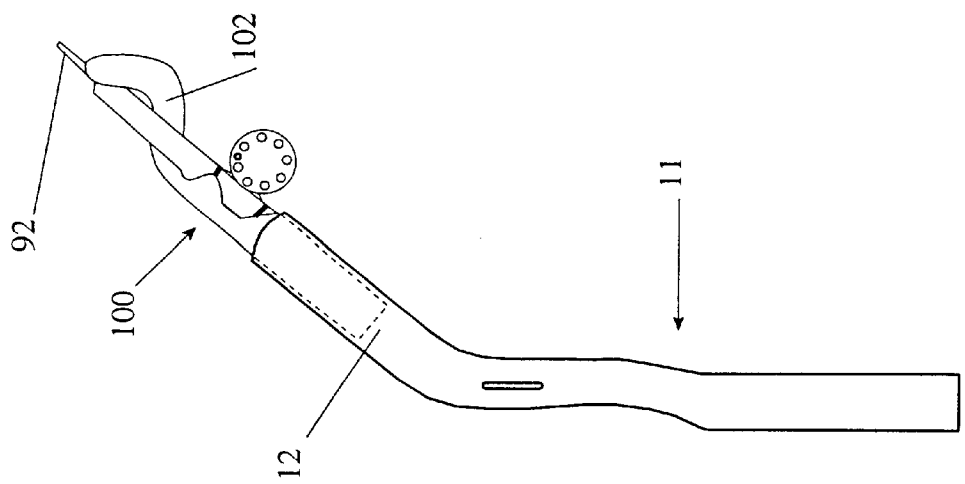
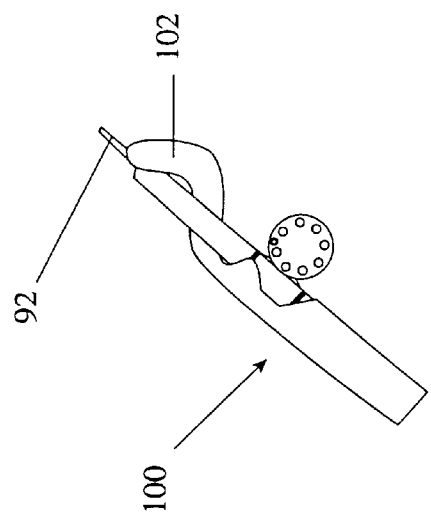
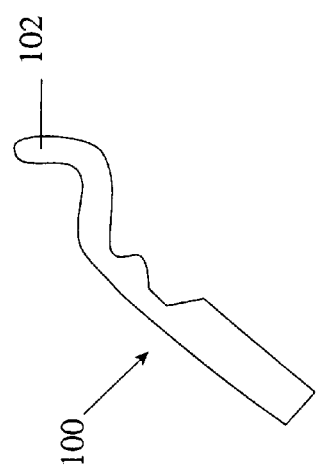
FIG 7C
FIG 7B
FIG 7A

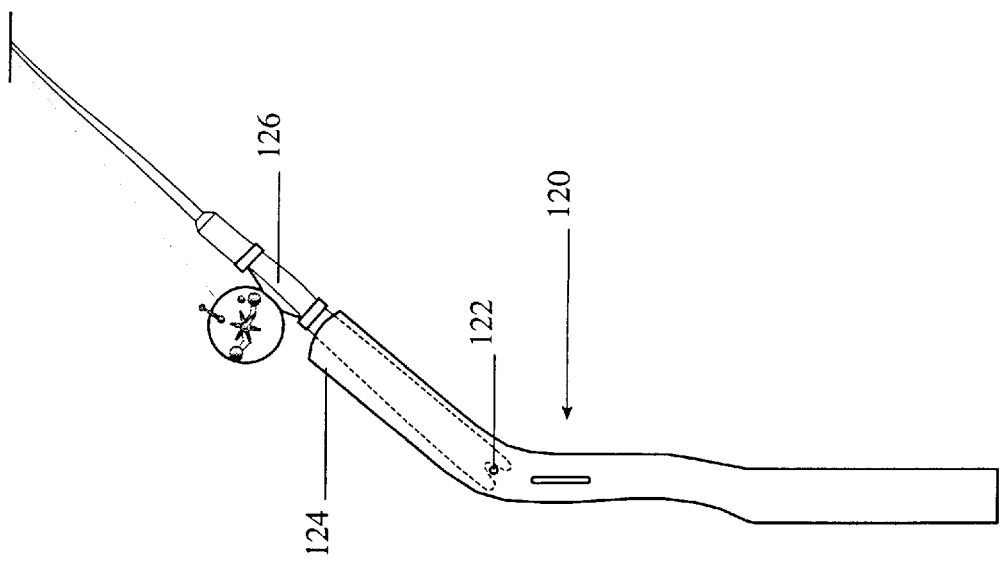
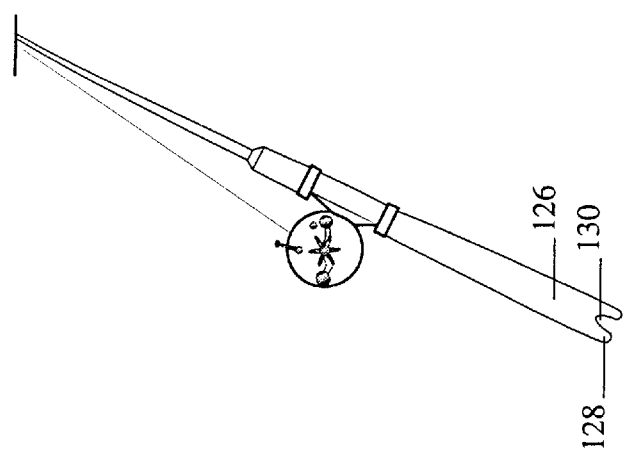
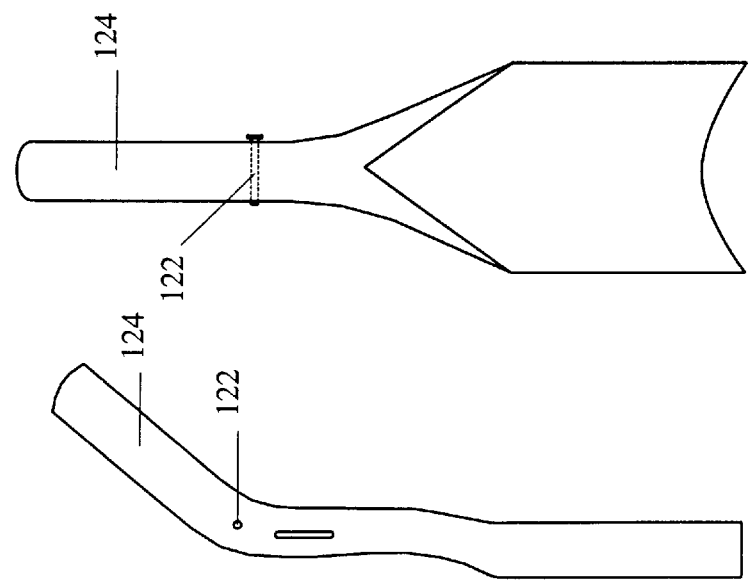

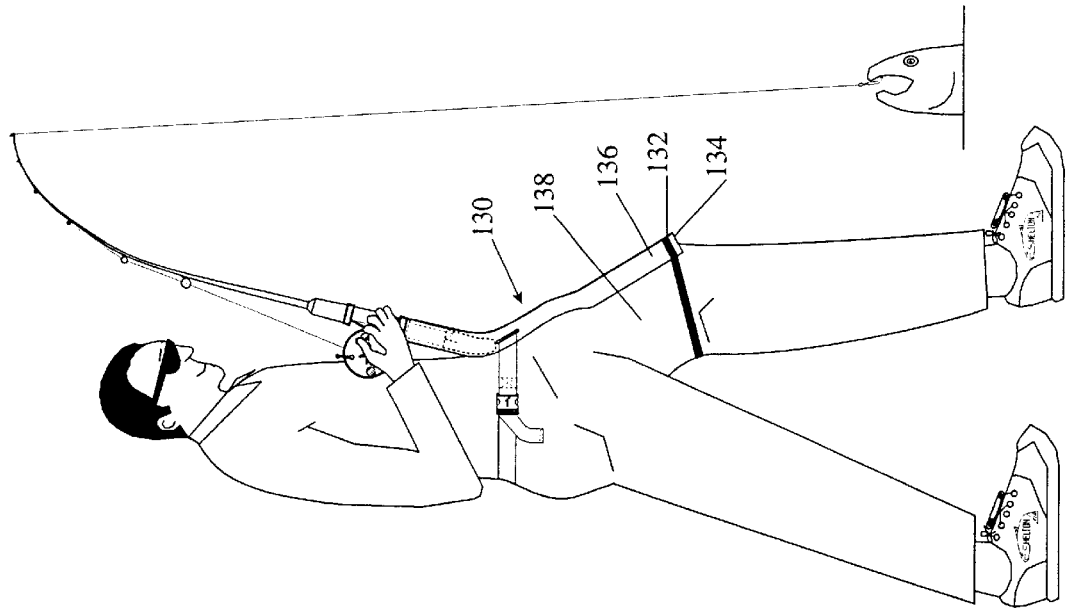
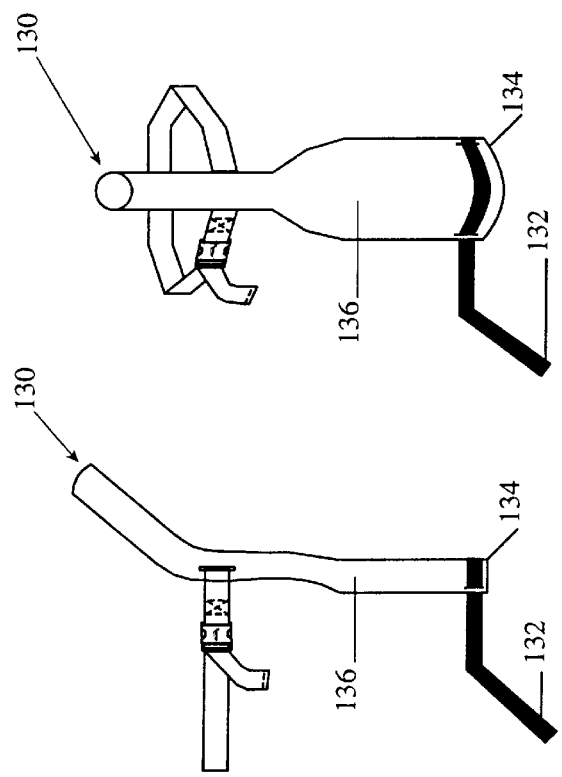
FIG 10C
FIG 10B
FIG 10A

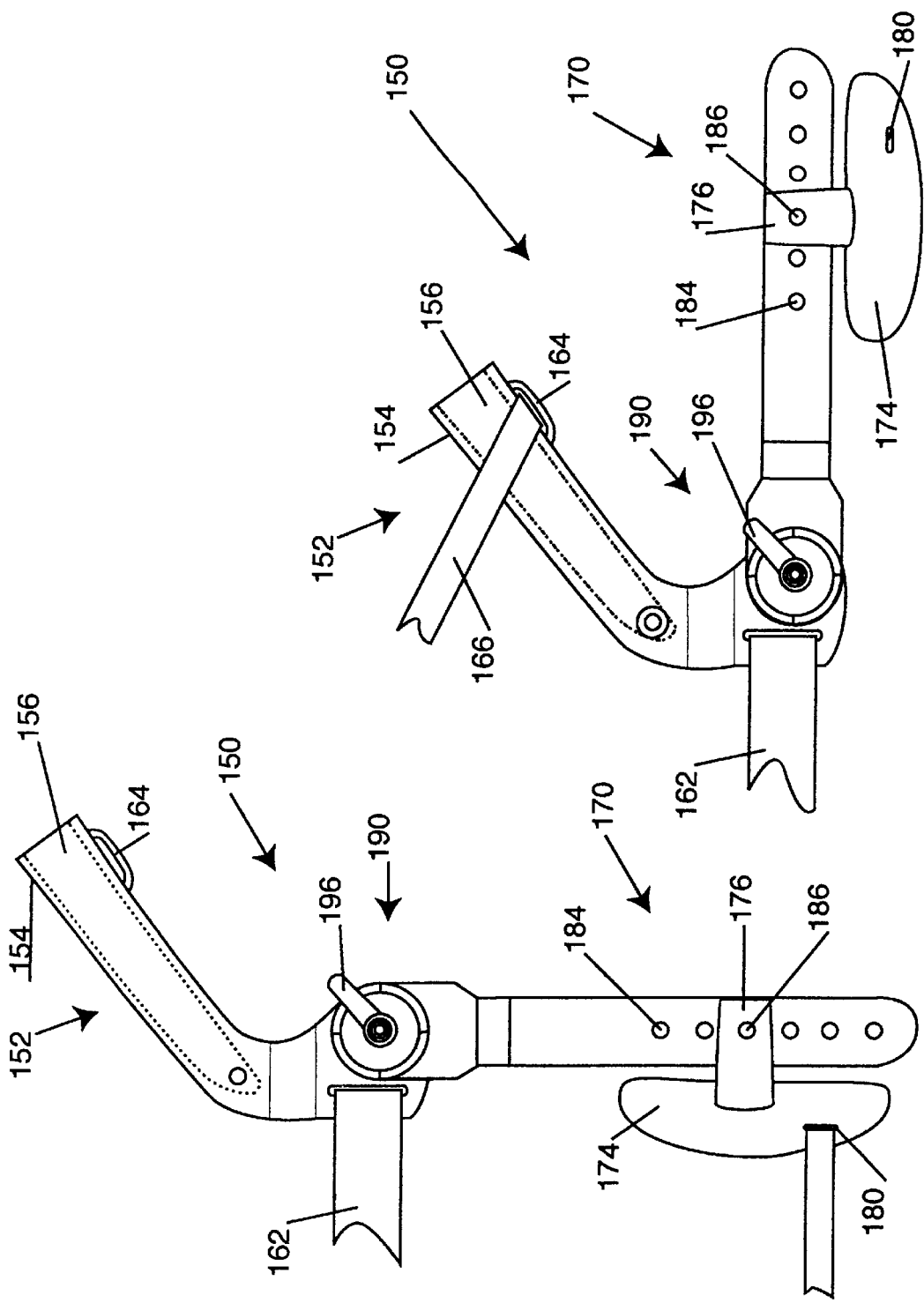

FISHING ROD CONTROLLER

CROSS REFERENCE TO OTHER APPLICATIONS

This application is a continuation-in-part of Ser. No. 08/789,762 filed Sep. 21, 1999, U.S. Pat. No. 5,953,846, filed Jan. 28, 1997, which claimed the benefit of U.S. Provisional Patent Application No. 60/011,245, filed Feb. 6, 1996.

FIELD OF INVENTION

The present invention relates generally to fishing devices. More particularly it relates to a fishing aid for holding and controlling and fishing rod. The present invention also functions as a rod controller for the physically challenged.

BACKGROUND OF THE INVENTION

The concept of fishing goes back before the beginning of recorded history, and man has continued to fish to provide food to eat and, today, as a recreational sport. As time has past, we have developed more and more refined fishing equipment and techniques to attract and catch fish. Some problems, however, have remained unsolved. For example, when fighting a large, strong fish, a fisherman may become worn down and in order to save the rod may have to cut the line, thereby loosing the fish as well as the hook and lure. This occurs because the fish, while trying to swim away from the fisherman, is using its entire body to pull away from the fisherman. On the other hand, the fisherman is balanced on two feet and must resist the pull from the fish by pulling with his or her arms and back. This means that a fish weighing 70 pounds can overpower and beat a fisherman weighing 165 pounds. A fish much smaller can beat those who are out of shape, have back problems or are physically challenged.

Many devices have been developed to hold a fishing rod. The devices are attached to the rail of a fishing boat or driven into the ground. These provide a stable base for boat or shore fishing. However, these devices allow no mobility during fishing. If the fisherman wishes to move, he or she must have someone hold their rod while moving the rod holder or vice versa. Several of these rod holders have bite detection systems. However, no bite detection system can compete with the sensitivity and discerning intellect of a human holding a rod. Nor do these devices aid the fisherman while fighting a fish. When a bite is detected, the fisherman removes the rod from the rod holder and fights the fish in the standard method.

Another set of devices which currently exist are wearable rod holders. These are formed of a cup or tube into which a fishing rod may be placed, a back plate to distribute the forces applied by the fishing rod and some form of attachment. The attachments range from a waist belt to a hook which hooks over the waistband of a user's pants. These devices provide vertical support for the fishing rod while the fisherman is waiting for a bite. While fighting the fish, the user must still user his or her arms and back to fight the fish, and if the rod remains in the holder, the back plate presses into their abdominal and groin areas. These devices do not increase the user's ability to fight a fish, nor remove any strain from the user's arms and back.

Therefore, there is quite clearly a need in the fishing industry for a device which would allow a fisherman to use more of their body weight and other muscles to fight a fish while still allowing mobility and versatility.

SUMMARY OF THE PRESENT INVENTION

In keeping with the foregoing discussion, the objective of the present invention is to provide a rod controlling aid for use with a fishing rod to provide more strength and endurance when fighting a large fish. This is optimally accomplished by taking advantage of the user's own body weight and leg strength instead of relying on the user's weaker arm and back muscles.

Another objective of the present invention is to provide a fishing aid that allows the user to decide whether they wish to use standard methods (arms and back muscles) for fighting a fish, or whether they wish to use their entire body weight and leg muscles.

A further objective of the present invention is to provide a fishing aid that allows the user to strike hard when setting their hook.

Yet another objective of the present invention is to hold the rod at the user's fingertips for easy access when desired or necessary.

Another objective of the present invention is to provide a fishing aid which can hold a fisherman's rod at any or all times during the process of catching a fish, including baiting a hook, fish biting, fighting a fish, netting a fish, removing a fish from a hook, raising or lowering a downrigger or when trolling. For optimal usage, the device should also hold the rod when sitting, standing, or even wading in a stream.

Another objective of the present invention is to provide a fishing aid which holds a fisherman's rod such that the fisherman is still highly attuned to slight movements of the line that would indicate a nibbling or biting fish.

A further objective of the present invention is to provide a device which is adjustable to allow the user to choose the angle at which the rod holder holds the rod.

Yet another objective of the present invention is to provide a fishing aid that allows the disabled or handicapped to successfully fish on their own. The device increases the fighting power that the fisherman can use to fight a fish and allows those with temporarily or permanently impairments to experience the joy and challenge of the sport of fishing.

Another objective of the present invention is to provide an aid for jigging and mooching.

The present invention can also function for a number of other uses, including as a gun rest while shooting or as an emergency tool for paddling, digging, splinting an injured limb, etc.

In keeping with these objectives, the present invention takes the form of a fishing rod controller having four general sections: the leg pad, the curve, the rod holder, and a belt. In one embodiment, the rod controller may be made by post-forming a section of extruded, rigid, pipe. In the section of the pipe that forms the leg pad, the pipe is split and spread apart. It is spread far enough to allow the user's leg to rest within the curve. Above the leg pad and just below the curve, is the belt attachment. The belt attachment is formed of splits on both sides of the pipe so belting material may be run through the slits. The belt is fit around the user's waist. Above the belt, the rod controller curves outward (away from the body of the user). The upwardmost section of the rod controller is the rod holder. This section is a hollow cylindrical section of the pipe which is left unaltered in the basic version of the rod controller. It is within the cavity in this rod holder section that the rod is placed.

A second embodiment of the rod controller has an adjustment mechanism that allows the user to select and hold the angle between the leg pad and the rod holder.

In alternate embodiments, the rod holding section of the rod controller may be modified for whatever use is desired. For example, a fly fishing rod has the reel located at the base of the rod. This means that the rod base would not fit in the standard rod controller. For this embodiment, the side of the rod holder is slit. In this case, the reel is aligned with the slit in the side of the rod holder and the rod is inserted. There are also embodiments for a fly rod extension and a gun rest extension. These are additions which may be bolted onto the basic rod controller so that the basic model of the rod controller may be used for a multiplicity of purposes.

BRIEF DESCRIPTION OF THE DRAWINGS

FIG. 2A is a right side view of the first embodiment of the rod controller without the waist strap.

FIG. 2B is a right side view of the first embodiment of the rod controller with the waist strap in place.

FIG. 2C is a front view of the first embodiment of the rod controller with the waist strap in place.

FIG. 3A is a side view of the rod controller being worn by a user while fishing.

FIG. 3B is a side view of the rod controller being worn by a user while setting the hook after a bite.

FIGS. 4A–E show an adjustable rod controller.

FIGS. 5A–E show an adjustable gun rest controller.

FIGS. 6A–C show an adjustable fly fishing rod controller.

FIGS. 7A–C show a fly fishing rod holder extension.

FIGS. 9A–D show a second twist-resistant version of the rod controller.

FIGS. 10A–C show a rod controller having a leg strap.

FIGS. 11A–E show an adjustable rod controller.

DETAILED DESCRIPTION OF THE INVENTION

Figure 1C:
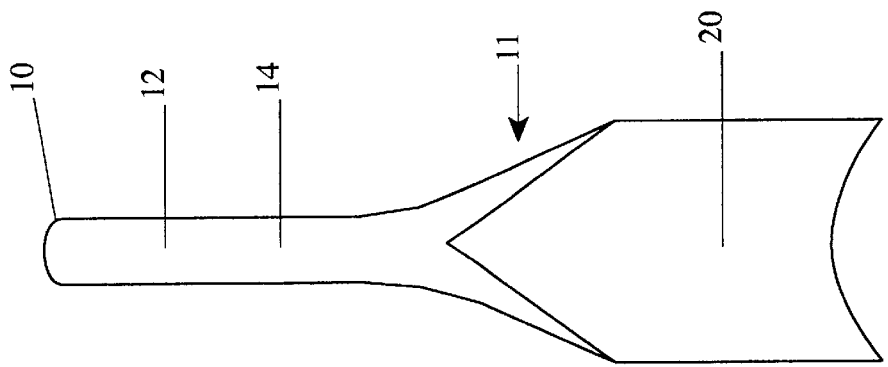
FIG. 1C back view of the first embodiment of the rod controller without the waist strap.
Figure 1B:
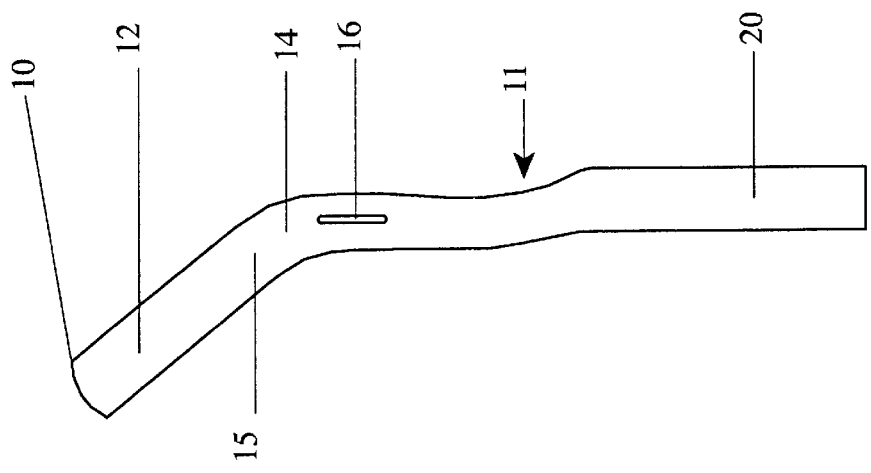
FIG. 1B is a left side view of the first embodiment of the rod controller without the waist strap.
Figure 1A:
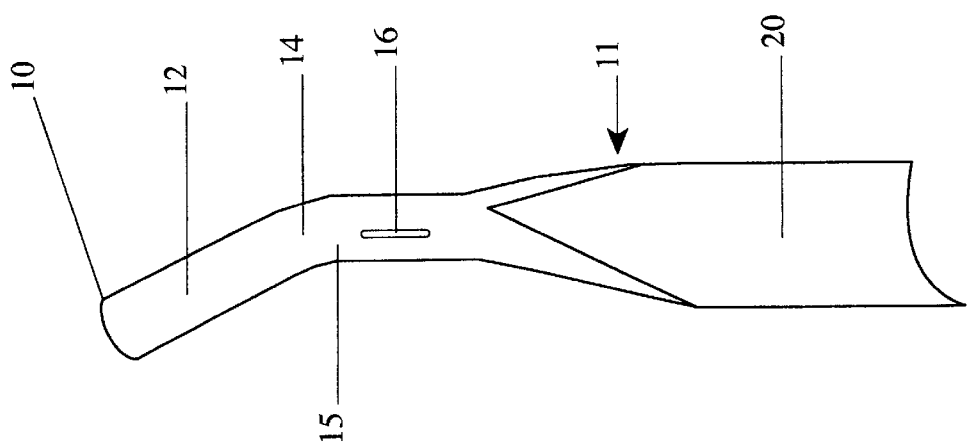
FIG. 1A is a perspective view of the first embodiment of the rod controller without the waist strap.

FIG. 1A is a perspective view, FIG. 1B a left side view, FIG. 1C a back-side perspective view, and FIG. 2A a right side view of the first embodiment of the rod controller 11 shown without the waist strap 22. FIG. 2B is a right side view and FIG. 2C a front view of the first embodiment of the rod controller 11 with the waist strap 22 in place. This embodiment is preferably used for spinning reel and bait casting fishing rods.

At the base of the rod controller 11 is a leg pad 20 which rests against either leg of a user. Moving upwards from the leg pad 20, the attachment 16 for the belt 22 is found. In this embodiment, the attachment 16 is formed by slits 16 through both sides of the controller 11. Through these two holes 16 a belt 22 is passed. In the preferred embodiment, a nylon mesh band 22 is used, although any other sturdy, flexible material may be used. For maximum performance, a non-elastic material is preferred over an elastic material. The two ends of the belt 22 are attached together with a buckle 24. Preferably, the buckle 24 should be quickly and easily adjustable. An example of such a configuration has a strap which loops around a bar in the buckle and is turned back on itself. The path of the strap is adjusted such that the strap may be easily pulled to tighten the belt, but the buckle must be rotated or adjusted to allow the belt to loosen. Since the belt 22 is what holds the rod controller 11 in place and is the pivot point which creates the lever arm allowing the use of the leg muscles, the attachment 16 of the belt 22 to the rod controller 11 must be made in a sturdy and stable way. Alternate belt 22 configurations include a belt strip 22 which is riveted, bolted, adhered, or otherwise locked into place with respect to the rod controller 11.

Above the belt 22, the rod controller 11 is bent outward (away from the torso of the user). The bend 14 holds the fishing rod at an angle to the body as one would ordinarily hold a fishing rod. This provides a normal feel to the rod orientation and allows for normal baiting, etc. The optimal angle, measured between the leg pad 20 and the rod holder 12, is currently considered 135°. The preferred range of angles is 130–140° but other angles outside this range may be used. The best angle will also vary depending on the user's size and configuration.

The uppermost section of the rod controller 11 forms a holder 12 to hold a fishing rod. As seen in FIGS. 1A–C and 2A–C, the rod holder 12 is connected to the leg pad 20 at the lower end of the base 15. The base 15 being located at the lowermost end of the rod holder 12. In the most basic form, the holder 12 is a hollow tube. In other embodiments the holder 12 may be formed to fit a particular rod or other tool. To use the rod controller 11, the handle of a rod is placed with the hole 10 at the upper end of the holder 12.

The rod controller 11 may be made of any relatively durable material, such as fiberglass, aluminum, conduit, polyvinyl chloride, ABS, and other plastics, thermoplastics and metals, either reinforced or unreinforced. The rod controller 11 may be made by any one of a number of conventional manufacturing processes, including machining, injection molding, blow molding, composite lamination, post-forming an extruded, rigid pipe, etc. The basic rod holder 12 should have an internal diameter of about 1.5 inches in order to fit most fishing rod handles. If the controller is to be used for other purposes, the internal diameter may be altered to accommodate the object to be held. In the post-formed version, the pipe is slit part way up one end and splayed. This forms the leg pad 20. For greater comfort for the wearer, a cushion could be added to the leg pad 20. However, the degree of pliability of the cushion is inversely proportional to the sensitivity effectiveness of the hook setting aspect of the rod controller 11.

FIGS. 3A and B are views of the rod controller 11 in use. The best configuration for wearing the rod controller 11, especially for women, is as follows. The back of the waist belt 22 should be about at the waist line. As the belt 22 comes around the front of the user, it should pass across the hip bone. The rod controller's 11 weight will tend to make the front of the belt 22 into a V. This is the appropriate configuration. This should place the bottom 21 of the leg pad 20 down near or at the knee of the user, and the thigh of the user should engage the leg pad 20 when the user stands normally. FIG. 3A shows the rod controller 11 being used to hold a rod 26 in place while a fisherman fights his fish in a relatively traditional manner. FIG. 3B shows a fisherman after he has used the rod controller 11 to set the hook in a fish 44. Hook setting is accomplished by one of a couple of methods. First, the user may lift or move forward the leg 28 against which the rod controller 11 is located. He may also step back with his other leg 34 (the leg without the rod controller). Other options will be discussed later.

FIGS. 4A–E relate to an adjustable version of the rod controller 58. FIG. 4A is an exploded cross-sectional view, FIG. 4B a cross-sectional front view, FIG. 4C an exploded left side view, FIG. 4D an exploded right side view, and FIG. 4E a right side view of an adjustable rod controller 58. In this case, the rod holder 62 and the leg pad 60 are two separate pieces which are attached together with an adjustment device 65. This particular configuration uses a threaded bolt 64 which runs through the bottom of the rod holder 62 and the top of the leg pad 60. Surrounding the holes 63 through which the bolt 64 rests and on the adjacent sides, the top of the leg pad 60 and the base of the rod holder 62 have teeth 68 which interlock. When tightened the nut 66 and bolt 64 hold the teeth 68 together and prevent any rotation between the two sections 62, 60. When the user wishes to change the angle of the pieces 62, 60, the user loosens the nut 66 and moves the rod holder 62 and leg pad 60 sections slightly apart so that the teeth 68 no longer engage. At this point, the user can adjust the angle between the two sections 62, 60, then tighten the nut 66 to assure that the teeth 68 reengage. The angle will then remain constant until the next adjustment.

FIGS. 5A–E relate to a gun rest version of the controller 69. FIG. 5A is a side view of this embodiment of the controller 69. In this case, instead of the rod holder, a gun rest extension 76 is provided. This provides a stable platform on which to mount or rest a firearm. FIG. 5B shows the gun rest controller 69 folded down. This embodiment as well as the other adjustable embodiments may be made such that the user may, in essence, fold the controller 69 in half at the adjustment mechanism 65. This provides a more compact storage configuration. FIG. 5C is a side view of the gun rest extension 76. It is formed from two parts, a holder 72 section and the gun rest extension 76. The holder 72 is a hollow tube with a collar 74. A thumb screw 78 or other locking mechanism penetrates the collar 74 and the holder 72 and bears against the base 80 of the gun rest extension 76 which has been inserted into the holder 72. This allows the user to adjust the height of the gun rest extension 76. This embodiment of the invention may be made in a form which has a number of different holders for different uses. The holders may be exchanged by removing the bolt 64, placing the new holder section, and reinserting the bolt 64. FIG. 5D is a front view of the gun rest embodiment 69. FIG. 5E is a side view of the gun rest embodiment 69 in use.

FIGS. 6A–C are views of an adjustable rod controller 89 for fly fishing rods 92. Since the reel 91 on a fly fishing rod 92 is attached at the base of the rod 92, the holder 90 is configured differently. In this case, there is an arm 93 that spirals upward. In order to insert the rod 92, the user inserts and twists the rod 92 until the rod 92 is properly secured within the holder 90. The arm 93 supports the rod 92 while still allowing access to the reel 91. As with the gun rest embodiment 69, the embodiment shown is a replacement piece for the standard rod controller holder 62 section. The bolt 64 is removed and the holder sections exchanged. Other holders could be created for holding, guiding or resting other objects. These holders would then be interchangeable with the other basic holders.

FIGS. 7A–C show an alternate version of the fly rod holder. In this version, an extension member 100 is inserted into the rod holder 12 of the first embodiment rod controller 11. A side view of the extension member 100 is shown in FIG. 7A. In FIG. 7B, a fly fishing rod 92 has been inserted into the fly fishing rod holder extension 100; and FIG. 7C shows the extension 100 with the rod 92 inserted into the rod controller 11. The extension member 100 friction fits, bolts, or otherwise attaches within the holder 12. As with the adjustable version, the rod 92 is held within a spiral arm 102 which provides support for the rod 92. Although only a single configuration has been shown for holding fly fishing rods 92, it is only an example, many other designs would also work. These designs could include: multiple spiral or straight arms; a straight, curved or irregular channel in an otherwise tubular member; a straight arm with a hook and loop fastener (velcro) collar; etc. For the slotted controllers, as the rod 92 is lowered into the fly fishing rod extension 100, the rod 92 is rotated so that the reel remains aligned with the slot. Once in place, the rod 92 cannot be tipped or pulled straight out of the extension. Instead the reverse of the insertion process must be performed; the rod 92 must be rotated as it is withdrawn from the extension.

Many different configurations of extensions may be used with the rod controller. Other versions for specific rods or other uses may also be developed. However, no matter the of the configuration of the upper portion of the extension, the base of the extension must attach or engage the rod holder. The attachment may be bolted to the rod controller, the base of the extension may be shaped similar to a standard rod handle so that it could merely rest in the rod holder, the base could be sized to just fit or friction fit within the channel or attached by some other temporary means. Alternately, if a controller is to be used specifically with one type or design of rod, the attachment may be attached to the controller by permanent adhesive or other permanent affixing methods. Another optional attachment mechanism is a set of mounts, one fits inside the rod controller and the other on the base of the fishing rod. The mounts are used to provide a more secure fit in cases where it is unacceptable or undesirable for the rod to move within the rod controller. The rod mounted piece is angled such that, when the rod is placed in the rod controller, the rod mounted piece will wedge in-between the controller mounted piece and the opposing wall of the rod controller. This wedges the handle of the fishing rod and prevents extraneous movement of the fishing rod.

Figure 8C:
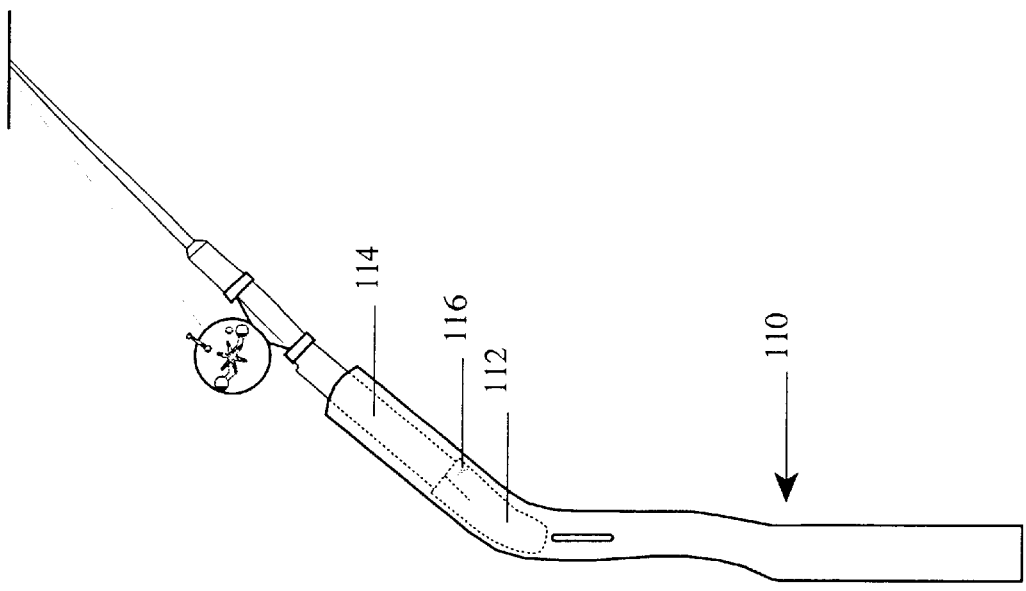
FIGS. 8A–C show a twist-resistant embodiment of the rod controller.
Figure 8B:
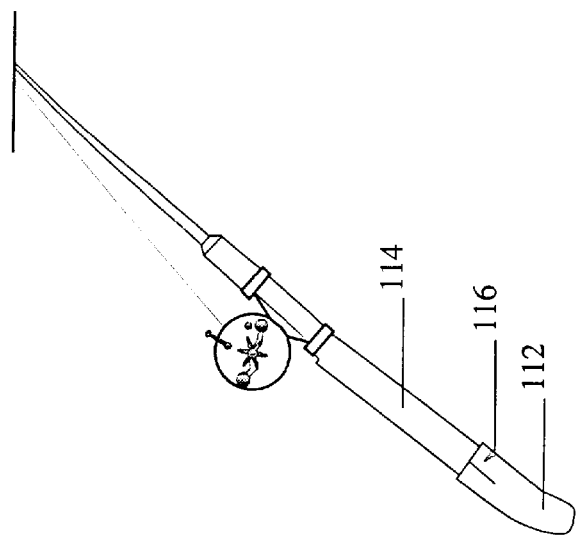
Figure 8A:
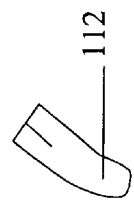

FIG. 8A shows a twist resistant version of the rod controller 110. As shown in FIG. 8B, an anti-twist base 112 is attached to the base of a fishing rod 114 by a screw 116 which penetrates the anti-twist base 112 and the fishing rod 114. Other means of attachment, such as friction, adhesive, or other mechanical means, may be used to attach the base 112 to the fishing rod 114. Shown in FIG. 8C, the rod 114 with the base 112 attached is inserted into the rod controller 110. When in place, the rod 114 is resistant to twisting because of the curve of the anti-twist base 112. The curve of the base 112 is within the curve of the rod controller 110 which prevents the rod 114 from significant twisting.

FIGS. 9A–D show a second twist resistant embodiment 120 using a gimbal. FIG. 9A is a side view and FIG. 9B is a back view of a second anti-twist embodiment 120. In this embodiment, a bolt or rod 122 forms a gimball and is secured between or through the sidewalls of the rod controller 124. A modified fishing rod 126, having a specially shaped base 128 surface, shown in FIG. 9C, is used. The base 128 of the rod 126 has an indentation 130 running from side to side. The indentation 130 in the bottom surface 128 of the rod 126, when placed within the rod controller 124, shown in FIG. 9D, will interlock with the bolt 122. As long as the rod 126 remains in place against the bolt 122, the bolt 122 will prevent the rod 126 from turning.

FIGS. 10A–C depict a version of the rod controller 130 for the physically challenged. In this case an additional strap 132 is provided which attaches the base 134 of the leg pad 136 to the user's leg 138. This allows users who have limited physical capabilities to assure that the leg pad 136 remains in place at all times. The strap 132 would have to be detached from the user's leg 138 when the user wished to move the controller 130 to his or her side for sitting or non use.

Figure 11B:
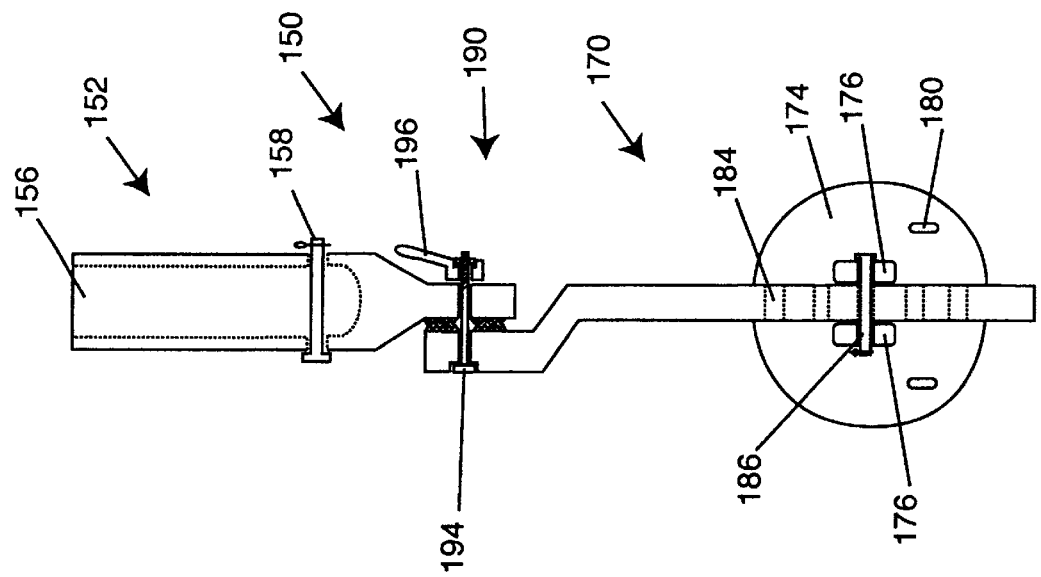
Figure 11A:
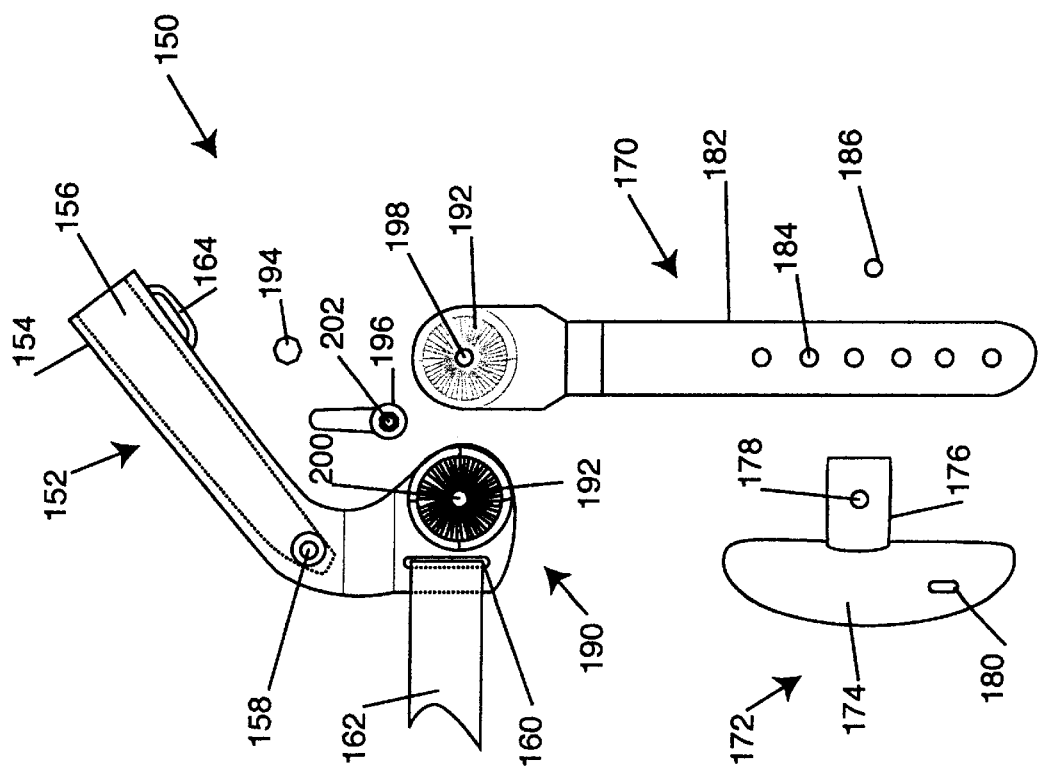
Figure 11E:
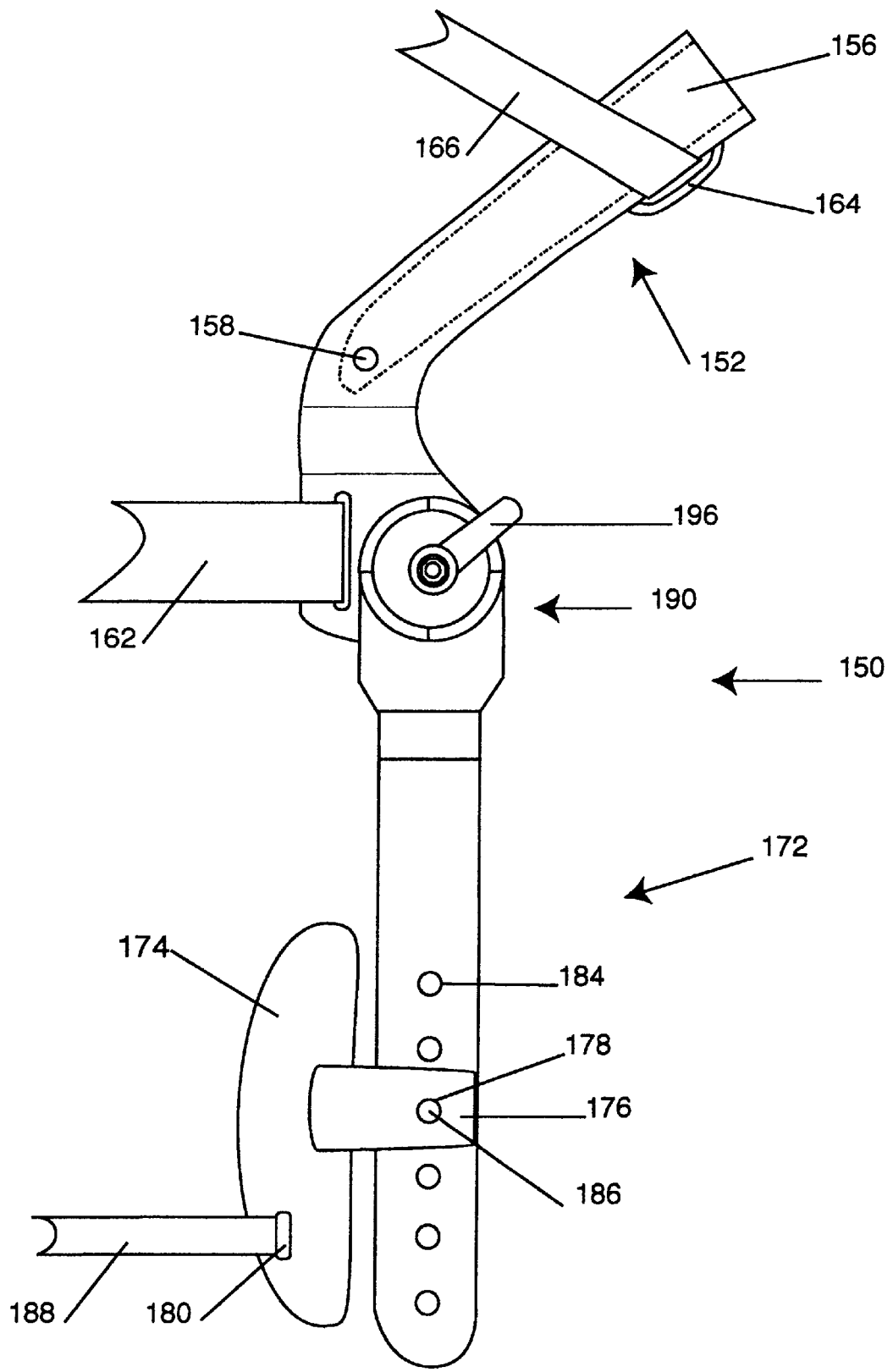
Figure 12B:
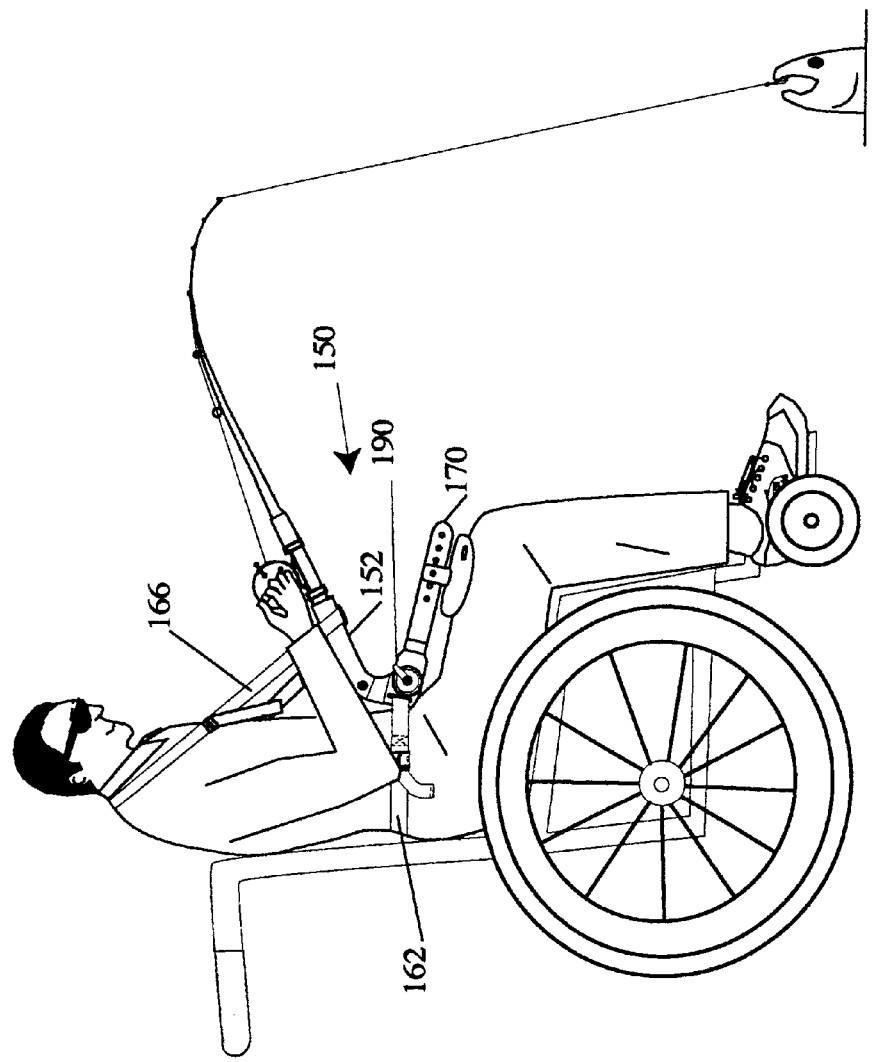
FIGS. 12A–B show the adjustable rod controller in use by handicapped fishermen.
Figure 12A:
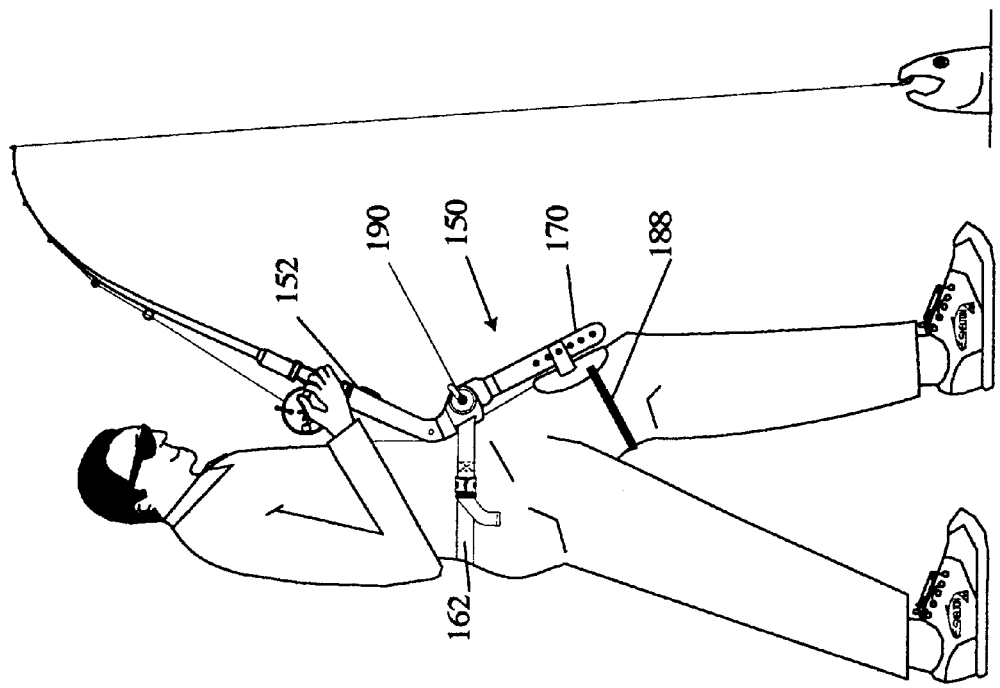

FIG. 11A is an exploded view of an adjustable rod controller 150. FIG. 11B is a front view. FIGS. 11C and 11D are side views in configurations for users in standing and sitting positions. FIG. 11E is a side view of the adjustable rod controller 150 with the optional straps. FIGS. 12A–B show the adjustable rod controller 150 in use by handicapped fishermen. In this case, the rod holder 152 and the leg pad 170 are two separate pieces which are attached together with an adjustment device 190. The particular configuration of adjustment device 190 shown uses a threaded bolt 194 which runs through an opening 200 in the bottom of the rod holder 152 and an opening 198 in the top of the leg pad 170 and engages a nut 196 having a handle and a threaded aperture 202 passing therethrough. Surrounding the holes 198, 200 through which the bolt 194 rests and on the adjacent sides, the top of the leg pad 170 and the base of the rod holder 152 have teeth 192 which interlock. When tightened, the nut 196 and bolt 194 hold the teeth 192 together and prevent any rotation between the two sections 152, 170. When the user wishes to change the angle of these pieces 152, 170, the user loosens the nut 196 by rotating the integral handle and moves the rod holder 152 and leg pad 170 sections slightly apart so that the teeth 192 no longer engage. At this point, the user can adjust the angle between the two sections 152, 170, then tighten the nut 196 to assure that the teeth 192 re-engage. The angle will then remain constant until the next adjustment.

The embodiment shown in FIGS. 11A–12B has a leg pad 170 formed of two parts: an adjustable, leg-engaging pad 172 and a leg pad arm 182. The adjustable, leg-engaging pad 172 has a curved surface 174 to engage the leg of the user and a pair of posts 176 extending from the back of the surface 174. The posts 176 have holes 178 extending therethrough. The leg pad arm 182 has a plurality of holes 184 along at least a portion of its length, preferably starting at or near the lower end of the leg pad arm 182. The user may adjust the height of the leg-engaging pad 172 by aligning the holes 178 in the posts 176 with the appropriate one of the holes 184 on the leg pad arm 182 and connecting the two pieces 172, 182 with a pin 186 or other suitable attachment mechanism. Optimally, the lower edge of the leg-engaging pad 172 will engage the user just above the knee. The hole 198 for the angle adjustment and interlocking teeth 192 are located on the upper end of the leg pad arm 182. The embodiment shown has two optional leg strap holes 180, one towards each side of the leg-engaging pad 172. If desired, a leg strap 188 may be passed through the leg strap holes 180 and wrapped around the users leg, thereby connecting the leg pad 172 to the user's leg.

The rod holder 152 has a belt opening 160 located behind the interlocking teeth 192 for the belt strap 162 to pass through. The rod holder 152 extends upward a short distance and then angles outward. The upper portion 154 of the rod holder 152 is hollow and tubular. At the base of the cavity 156 therein is an optional gimball bolt 158. The gimball bolt 158 is used with gimballed rods. Near the upper end of the rod holder 152 is an optional upper strap guide 164. An upper strap 166 may pass through the upper strap guide 164 and over the shoulder of the user, as seen in FIG. 12B.

Optimally, all of the materials used for the rod controller should function equally well when either wet or dry. It is preferred that they be relatively lightweight when wet and dry so that they not add significant weight to the user and are not a significant burden when worn for a long period of time. Finally, it is also preferred that the materials dry relatively quickly so that the rod controller will not mildew, etc. when stored after fishing. Currently preferred are plastics since they do not absorb water; however, other materials may be used.

OPERATIONAL DESCRIPTION

The rod controller uses leg movement, leg muscles, and body weight, as well as the arms and back to fight fish. Effectively, the length of the pole is extended by approximately 2 feet (the length of the rod controller between the base of the fishing rod and the bottom of the leg pad). Once the belt is attached to the user, the rod controller pivots at the belt connection point. This causes the leg pad to act as a lever arm. With this lever arm, the leg muscles easily apply force to the leg pad. The force applied is transmitted up to the handle of the fishing rod, and allows the user to easily and effectively control the fishing rod without using arm and back muscles except for reeling and guidance. Therefore, it allows the user to easily and effectively set a hook in a fish. It holds a rod for a user while lowering a downrigger, sitting, standing, wading, trolling, baiting, striking, fighting, netting, and removing fish. A user's rod is always at his or her fingertips and the fisherman has extreme sensitivity for bite detection even if napping. While sitting, flipping the rod controller sideways holds the rod to a user's side for trolling. The rod controller aids a user with jigging and mooching. It allows a person with the use of only one arm to strike and retrieve fish with standard rod and reels. This means that if a user has a broken or injured hand, arm or shoulder, he or she can still fish. Other uses are as a splint for a broken leg or arm, emergency paddle or shovel and as an arm rest while standing.

To pull a fish in, always face in the direction of the fish. If the fish runs sideways around the boat, turn to keep facing the fish and follow. If you have to run after the fish, pull back on the rod with both hands to disengage any contact between your leg and the rod controller, or twist the rod controller so that is lies diagonally across your body and the leg pad extends off to the side, or remove the rod from the rod controller until you are ready to resume fighting the fish.

There are several ways to use the rod controller after you have a bite. The first option is as follows: shift your weight slightly by bending the leg on which the rod controller is mounted. This causes your body weight to do the work of pulling on the fish. Shift your weight back to the other leg as you reel down to take up the line.

Another option is to lift the heel and bend the leg on which you have the rod controller to pull fish in and lower the heel as you reel down to take up line. (This is also the hook setting mode.)

A third option is to do slight knee bends (or squats) to pull in the fish. Then stand upright as you reel in the line.

A further option is to step back with your free foot (the leg that does not have the rod controller) and bend your knee. This rotates the rod and pulls the fish in. Step forward with the same leg as you reel in the line.

Another option is to use the traditional method to fight the fish. You can, at any time, decide not to use the rod controller. To do this you merely remove the fishing rod from the rod controller and fight the fish by whatever means is desired.

The above options are exemplary of the ways a user may use the rod controller. Other variations, or combinations thereof, may also be used.

There are also several modes of operation when not being used or when waiting for a fish to bite. First, a fisherman may turn the rod controller to his or her side. This allows the fisherman to sit, walk or engage in other activities while keeping the rod controller out of the way, but not out of reach. While sitting, the belt is loosened and the leg pad is placed between your legs and the rod controller holds your rod centered in front of you.

While jigging, the user raises and lowers his or her heel of the leg the rod controller is on and holds the line with his or her fingers to help detect a bite. To set a hook, quickly lift the leg the rod controller is on.

While mooching, the rod controller holds the rod for the user, and the user occasionally makes the motions described for jigging above.

While sitting, the user may turn the rod controller to either of the user's sides for trolling. Since the rod controller may be used on either side, both left-handed and right-handed users can use a single rod controller, or a user may wish to alternate.

The adjustable rod controller shown in FIGS. 11A–12B may be used by the handicapped who have lost the use of one or more appendages, allowing them to strike and retrieve fish with a standard rod and reel. The rod controller may be operated by an arm, leg, upper body or a combination of these. For example, a person who has lost the use of one arm is shown in FIG. 12A with the rod controller belt around the waist and strapped to his left leg. In this configuration, the rod is held and moved with the rod controller by the left leg. The user's arm may be used to reel in the fish.

FIG. 12B shows a fisherman in a wheelchair having lost the use of both legs. While sitting in the wheelchair, the web belt is placed around the user's waist and adjusted to fit loosely with the leg pad laying forward along the top of the user's thigh. The leg pad may be aligned with either leg depending on the physical capabilities, comfort and desire of the user. The optional upper strap loops over the neck and under one arm of the user. The upper strap remains loose until the user chooses to use upper body strength to pump the rod, at which point the upper strap is tightened while the user is leaning forward. While the upper strap is taut, when the user leans back, the rod holder, and thereby the rod, are pulled upward. When the user leans forward, the rod holder and rod dip downward. The leg pad assures that the rod controller will not dip too far.

If the user has lost the use of one leg, the rod controller may be attached to the remaining leg and operated similar to the previous descriptions. However, with the use of one leg, the user may choose not to use the upper strap and instead lift the leg the move the rod controller up and down. Partial or other handicaps may also be solved using variations of those listed above.

Many features have been listed with particular configurations, options, and embodiments. Any one or more of the features described may be added to or combined with any of the other embodiments or other standard devices to create alternate combinations and embodiments.

Although the examples given include many specificities, they are intended as illustrative of a few possible embodiments of the invention. Other embodiments and modifications will, no doubt, occur to those skilled in the art. For example, the present invention can be used with many sorts of hunting or sporting implements such as fishing rods, guns, rifles, other firearms, photographic and video equipment, binocular and sporting scopes, surveying equipment, and other things that need to be held steady. This could also be used as an aid for the handicapped to hold an arm steady while doing something or as an assist for lifting things. Thus, the examples given should only be interpreted as illustrations of some of the preferred embodiments of the invention, and the full scope of the invention should be determined by the appended claims and their legal equivalents.

I claim:

1. A fishing rod controller for holding a fishing rod, comprising:
    a fishing rod holder configured to hold the fishing rod, said fishing rod holder having a lower end,
    a leg pad extending downward from said lower end of said fishing rod holder,
    an adjustable connector connecting said lower end of said fishing rod holder and an upper end of said leg pad,
    and a strap extending from said fishing rod controller to attach said fishing rod controller to a user, said strap being attached proximate said adjustable connector.

2. The fishing rod controller of claim 1 further comprising a leg strap passing through at least a portion of said leg pad.

3. The fishing rod controller of claim 1 wherein said fishing rod holder comprises an upper strap guide attached thereto and an upper strap engaging said upper strap guide, said upper strap sized and configured to pass over a shoulder of the user.

4. The fishing rod controller of claim 1 wherein said adjustable connector adjusts an angle between said fishing rod holder and said leg pad.

5. The fishing rod controller of claim 4 wherein said angle is adjustable between 0° and 180°.

6. The fishing rod controller of claim 1 wherein said adjustable connector comprises interlocking projections on an upper portion of said leg pad and a lower portion of aid fishing rod holder.

7. The fishing rod controller of claim 6 further comprising a nut and a bolt electively holding said interlocking projections together.

8. The fishing rod controller of claim 1 wherein said fishing rod holder is a generally circular channel into which a fishing rod may be placed.

9. The fishing rod controller of claim 1 wherein said fishing rod holder is interchangeable with a different holder.

10. The fishing rod controller of claim 1 wherein said fishing rod holder comprises a holder and an extension member, said extension member being adapted to be held within said holder and wherein said extension member is adapted to hold the fishing rod controlling device.

11. The fishing rod controller of claim 1 further comprising a locking connector for locking said adjustable connector to rigidly couple said fishing rod holder and said leg pad for transferring torque applied on said leg engaging means to the fishing rod.

12. The fishing rod controller of claim 1 wherein said fishing rod holder is configured to, when worn by a user, extend above the user's waist.

13. The fishing rod controller of claim 1 wherein, when worn by the user, at least a majority of said fishing rod holder extends above the user's waist.

14. A fishing rod controller for holding a fishing rod, comprising:
    a fishing rod holder configured to hold the fishing rod, said fishing rod holder having a lower end,
    a leg pad extending downward from said lower end of said fishing rod holder, said led pad including a leg-engaging pad and a leg pad arm, said leg engaging pad being adjustably connected with said leg pad arm, an adjustable connector connecting said fishing rod holder and said leg pad, and a strap extending from said fishing rod controller to attach said fishing rod controller to a user.

15. A fishing rod controller, comprising:

a holding means adapted to hold a fishing rod, a leg engaging means adapted to engage a leg of a user, a user attachment means for attaching the fishing rod controller to the user, said attachment means attached to said fishing rod controller at a lower end of said holding means, and an adjustable attachment means for attaching said lower end of said holding means to an upper end of said leg engagement means.

16. The fishing rod controller of claim 15 wherein said holding means comprises a holder and an extension member, said extension member being adapted to be held within said holder and wherein said extension member is adapted to hold an implement chosen from a group of implements consisting of fishing rods, firearms, photographic equipment, video equipment, binoculars, spotting scopes and surveying equipment.

17. The fishing rod controller of claim 15 wherein said holding means comprises a holder and an extension, said extension member having a tubular body having a sidewall, a slot in said sidewall extending downward from an upper end of said extension, said extension being adapted to be held within said holder.

18. The fishing rod controller of claim 17 wherein said extension is configured to retain a fly fishing rod.

19. The fishing rod controller of claim 15 wherein said adjustable attachment means comprises interlocking projections on said upper end of said leg engaging means and said lower end of said holding means.

20. The fishing rod controller of claim 15 wherein said rod holder is selectively rigidly coupled to said leg pad for transferring torque applied on said leg pad to said rod holder to control the fishing rod held therein.

21. The fishing rod controller of claim 15 wherein said leg engagement means extends proximate a knee of the user.

* * * * *